(12) United States Patent
Cairns

(10) Patent No.: US 11,870,259 B2
(45) Date of Patent: Jan. 9, 2024

(54) ELECTRICAL LOAD BALANCING DEVICE

(71) Applicant: Taner-Jay Cairns, Calgary (CA)

(72) Inventor: Taner-Jay Cairns, Calgary (CA)

(*) Notice: Subject to any disclaimer, the term of this patent is extended or adjusted under 35 U.S.C. 154(b) by 0 days.

(21) Appl. No.: 17/622,754

(22) PCT Filed: Jun. 29, 2020

(86) PCT No.: PCT/CA2020/050907
§ 371 (c)(1),
(2) Date: Dec. 24, 2021

(87) PCT Pub. No.: WO2020/257951
PCT Pub. Date: Dec. 30, 2020

(65) Prior Publication Data
US 2022/0278526 A1 Sep. 1, 2022

Related U.S. Application Data

(60) Provisional application No. 62/868,845, filed on Jun. 28, 2019.

(51) Int. Cl.
*H02J 3/14* (2006.01)
*G05B 15/02* (2006.01)
*H02J 13/00* (2006.01)

(52) U.S. Cl.
CPC .............. *H02J 3/14* (2013.01); *G05B 15/02* (2013.01); *H02J 13/00004* (2020.01)

(58) Field of Classification Search
CPC ... Y02B 90/20; Y02B 70/3225; Y04S 20/222; Y04S 20/242; H02J 3/14; H02J 2310/14;
(Continued)

(56) References Cited

U.S. PATENT DOCUMENTS 5,442,335 A * 8/1995 Cantin .................. H02J 3/08
340/310.14
6,806,446 B1 10/2004 Neale
(Continued)

FOREIGN PATENT DOCUMENTS

| CA | 2975594 A1 | 2/2018 |
|---|---|---|
| EP | 1441430 B1 | 5/2015 |

OTHER PUBLICATIONS

International Search Report issued on corresponding PCT Application No. PCT/CA2020/050907 dated Oct. 30, 2020.
(Continued)

*Primary Examiner* — Darrin D Dunn
(74) *Attorney, Agent, or Firm* — MBM Intellectual Property Law LLP

(57) ABSTRACT

A method for controlling an electric device includes monitoring a usage of an electric supply of an electric network and determining that an excess capacity of the electric supply is less than a required power of the electric device. Monitoring the use of the electric supply where the monitoring of the electric supply includes filtering expected electric supply oscillations of the electric supply. Determining that the excess capacity has become greater than the required power. Waiting, in response to determining that the excess capacity has become greater than the required power, a delay time based on a usage profile of the electric supply and enabling the power of the electric device.

24 Claims, 6 Drawing Sheets

(58) Field of Classification Search
CPC ........... H02J 13/00004; H02J 13/00002; H02J 3/144; H02J 2310/60; H02J 3/003; H02J 3/241; H02J 3/28
See application file for complete search history.

(56) References Cited

U.S. PATENT DOCUMENTS

| | | | |
|---|---|---|---|
| 7,528,503 B2 | 5/2009 | Rognli et al. | |
| 7,687,935 B2* | 3/2010 | Bailey | B60H 1/00364 361/28 |
| 8,195,337 B2* | 6/2012 | Cruickshank, III | G06Q 10/00 700/286 |
| 8,704,678 B2* | 4/2014 | Wang | H02J 3/14 340/870.01 |
| 8,912,683 B2* | 12/2014 | Dames | H02J 3/14 318/560 |
| 8,930,037 B2 | 1/2015 | Brian et al. | |
| 9,031,824 B2 | 5/2015 | Nasle | |
| 9,647,495 B2* | 5/2017 | Bonicatto | H02J 3/14 |
| 10,108,915 B2* | 10/2018 | Westergaard | G06Q 50/06 |
| 11,183,843 B1* | 11/2021 | Cooper | H02J 3/38 |
| 11,522,365 B1* | 12/2022 | Cooper | H02J 3/14 |
| 2002/0162032 A1* | 10/2002 | Gundersen | H02J 13/00034 713/300 |
| 2004/0254688 A1* | 12/2004 | Chassin | H02J 3/241 700/295 |
| 2006/0229768 A1* | 10/2006 | Chassin | H02J 3/14 700/286 |
| 2008/0172312 A1* | 7/2008 | Synesiou | H02J 13/00034 705/40 |
| 2008/0272934 A1* | 11/2008 | Wang | H02J 13/00024 340/870.11 |
| 2010/0274407 A1* | 10/2010 | Creed | H02J 3/32 700/295 |
| 2011/0121791 A1* | 5/2011 | Basham | H02J 7/00 320/137 |
| 2011/0198922 A1* | 8/2011 | Dames | H02J 3/14 307/18 |
| 2012/0313434 A1 | 12/2012 | Billmaier | |
| 2013/0179061 A1 | 7/2013 | Gadh et al. | |
| 2014/0246925 A1* | 9/2014 | Porter | H02J 3/14 307/115 |
| 2014/0358308 A1* | 12/2014 | Steckley | H02J 13/00 700/292 |
| 2014/0379153 A1* | 12/2014 | Lyren | G05B 13/026 700/291 |
| 2015/0112501 A1* | 4/2015 | Rombouts | H02J 3/14 700/295 |
| 2015/0207323 A1* | 7/2015 | Baba | H02J 3/381 307/20 |
| 2016/0013646 A1* | 1/2016 | Akerson | H02J 13/00004 307/39 |
| 2017/0005475 A1* | 1/2017 | Piyabongkarn | H02J 3/46 |
| 2017/0005515 A1 | 1/2017 | Sanders et al. | |
| 2017/0033560 A1* | 2/2017 | Berdner | H02J 13/00002 |
| 2018/0111493 A1 | 4/2018 | Chan et al. | |
| 2019/0070970 A1 | 3/2019 | Chan et al. | |
| 2021/0057910 A1* | 2/2021 | Zimmanck | G05B 19/042 |
| 2022/0123584 A1* | 4/2022 | Pancheri | G01R 11/04 |
| 2022/0209536 A1* | 6/2022 | Lyren | H02J 3/14 |
| 2022/0227938 A1* | 7/2022 | Clement | C09K 3/1006 |

OTHER PUBLICATIONS

Written Opinion issued on corresponding PCT Application No. PCT/CA2020/050907 dated Oct. 30, 2020.

* cited by examiner

300

ELECTRICAL LOAD BALANCING DEVICE

CROSS-REFERENCE TO RELATED APPLICATIONS

This application claims the benefit of priority to U.S. Patent Application Ser. No. 62/868,845 entitled "INTELLIGENT ELECTRIC LOAD BALANCING DEVICE" filed Jun. 28, 2019, which is hereby incorporated by reference in its entirety.

FIELD OF THE INVENTION

The present invention pertains to the distribution of electric power, and in particular to a methods and apparatus for controlling the power supply to high demand electrical devices.

BACKGROUND

There is an increasing demand for high current electrical loads such as induction ranges, electrical vehicle (EV) chargers, tankless water heaters, etc. There is also a need to provide for the more efficient use of the available grid electricity, reducing the electrical cost to customers, and maximise the time that the end device being controlled will have power.

Many electrical loads or devices are designed to be switched on for use and then off again then they are no longer required. These devices may be switched on and off over their lifetime without being damaged. However, they do not operate well with their power turning on and off very frequently, such as every few minutes, seconds, or fractions of seconds. Integrating these devices into existing variable load electrical services, with some loads that turn on and off with different frequencies can be quite difficult, especially if the introduction of the new load may cause the total power use of the system to exceed the maximum amount it was designed for. If this issue cannot be addressed, it can require costly electrical service upgrades to rectify.

As an example, a house may have a 100 Amp electrical service and need to install a 60 Amp EV charging system. The current electrical supply will not allow such an installation with the other, already existing loads, as it will overload the system during periods of high usage. The situation is further complicated by the possibility of a single high electrical demand device that uses a low oscillation or high frequency switching electrical system such as an induction range or other similar loads. That is because many loads such as an EV charger will not tolerate switching on and off many times in a short time span. The situation is further complicated by the likelihood of many devices that may be turning on and off independently at peak hours. The variable loads that this may cause will also turn the EV charger on and off at an intolerable frequency when the system is overloaded, which may damage or reduce the life span of the EV charger.

Therefore, there is a need for a method and apparatus for controlling the electric power supplied to high demand devices that obviates or mitigates one or more limitations of the prior art, for example by controlling the electric supply to the device so that the device receives electrical current that meets the operational requirements of the device and so that the total electrical capacity of the available electrical service is not exceeded.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for controlling the electrical supply to an electrical device while meeting the operational requirements of the device. A further object is to control the electrical supply to one or more such electric devices so as not to exceed the capacity of the available electric service. Embodiments monitor the total electric current supplied to an electric network and the operation of electric devices under control. Embodiments control the supply to electric devices by detecting when they are operating and when they have finished operating based on profiles of each device being controlled and other uncontrolled devices in the electrical system.

In accordance with embodiments of the present invention, there is provided a method for controlling an electric device including monitoring, by a controller, a usage of an electric supply of an electric network. The method further includes determining, by the controller, that an excess capacity of the electric supply is less than a required power of the electric device. Monitoring, by the controller, the use of the electric supply where the monitoring of the electric supply including filtering oscillations of the electric supply. Determining, by the controller, that the excess capacity has become greater than the required power. Waiting, by the controller, in response to determining that the excess capacity has become greater than the required power, a delay time based on a usage profile of the electric supply and enabling the power of the electric device.

A technical benefit of this method is that multiple electric devices, that if all used simultaneously would overload the electric network, may be used sequentially, alleviating the need for increasing the capacity of the electric network. A further benefit is that the delay time prevents the enabling of a device only to have to disable it again shortly afterwards in a manner than may damage the device.

In further embodiments, the usage profile includes values defining parameters of the expected electric supply oscillations, and the delay time.

Further embodiments include receiving over a network interface, configuration information of the usage profile.

In further embodiments, the usage profile includes electrical cost time of use information.

In further embodiments, the monitoring of the usage of the electric network is performed continuously.

In further embodiments, the delay time is based on a schedule of the electric supply.

In further embodiments, the controller is in communication with a second controller of a second electric device using a second electric supply, and the determining that there is an excess capacity includes receiving usage information of the second electric device from the second controller.

Further embodiments include sending, by the controller, a status of the electric device to a controller of the electric network.

In further embodiments, the delay time is based on a schedule of past usage of the electric device.

Further embodiments include monitoring, by the controller, the usage of the electric supply, detecting an increase in the usage of the electric supply that would exceed the capacity of the electric supply, and reducing the power of the electric device.

In accordance with embodiments of the present invention, there is provided an apparatus for controlling an electric device. The apparatus includes a microprocessor and a computer readable, non-transitory memory storing instruction. When executed, the instructions cause the apparatus to monitor a usage of an electric supply of an electric network, determine that an excess capacity of the electric supply is less than a required power of the electric device, monitor the use of the electric supply, the monitoring of the electric supply including filtering oscillations of the electric supply. Determine that the excess capacity has become greater than the required power. Wait, in response to determining that, a delay time based on a usage profile of the electric supply and enabling the power of the electric device.

A technical benefit of this apparatus is that multiple electric devices, that if all used simultaneously would overload the electric network, may be used sequentially, alleviating the need for increasing the capacity of the electric network.

In further embodiments, the usage profile includes values defining parameters of the expected electric supply oscillations, and the delay time.

In further embodiments, the stored instructions when executed by the microprocessor cause the apparatus to receive over a network interface, configuration information of the usage profile.

In further embodiments, the usage profile includes electrical cost time of use information.

In further embodiments, the monitoring of the usage of the electric network is performed continuously.

In further embodiments, the delay time is based on a schedule of the electric supply.

In further embodiments, the stored instructions when executed by the microprocessor cause the apparatus to further communicate with a second controller of a second electric device using a second electric supply, wherein the determining that there is an excess capacity includes receiving usage information of the second electric device from the second controller.

In further embodiments, the stored instructions when executed by the microprocessor cause the apparatus to send a status of the electric device to a controller of the electric network.

In further embodiments, the delay time is based on a schedule of past usage of the electric device.

In further embodiments, the stored instructions when executed by the microprocessor cause the apparatus to further monitor the usage of the electric supply, detect an increase in the usage of the electric supply that would exceed the capacity of the electric supply, and reducing the power of the electric device.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide a method and apparatus for controlling the electrical supply to an electrical device to maximize the use of the device without damaging it. A further object is to control the electrical supply to one or more such electric devices so as not to exceed the capacity of the available electric service. Embodiments allow for the efficient use of high current devices in an electric network or grid and may alleviate the need to increase the overall capacity of the network. Throughout this document, the term "electric network" will be used which may include any number of electrical networks such as a network or wiring within a residence, building, factory, or campus, or an electrical grid on a residential street, neighborhood, city, or region.

Embodiments monitor the total electric current supplied to an electric network and the operation of electric devices under control. Embodiments control the supply to electric devices by detecting when they are operating and when they have finished operating based on usage profiles of each device being controlled. Embodiments monitor the use of the electric network to determine when it may enable or supply power to a controlled electric device without exceeding operational parameters of the controlled device including how frequently the controlled device may be turned on and off. In the case that the use of the electric network exceeds a threshold and may exceed the maximum capacity of the electric network, controlled electric devices may be shut down, disabled, or have their power removed to prevent overloading the electrical network. An electric device may include any electric load, device, appliance that draws electric power or current to operate. Embodiments may control a single electrical device in the network or a plurality of devices. In the electrical network, there may be other devices that are not controlled by embodiments.

Control of an electric device may include turning the electric power supplied to the device on or off, varying the voltage or current supplied, or varying the frequency or phases of the electric power supplied to the device. Embodiments control the electric power supplied to a device in a manner that does not exceed the electrical parameters of the device to ensure that the device operates efficiently or is not damaged.

Figure 1:
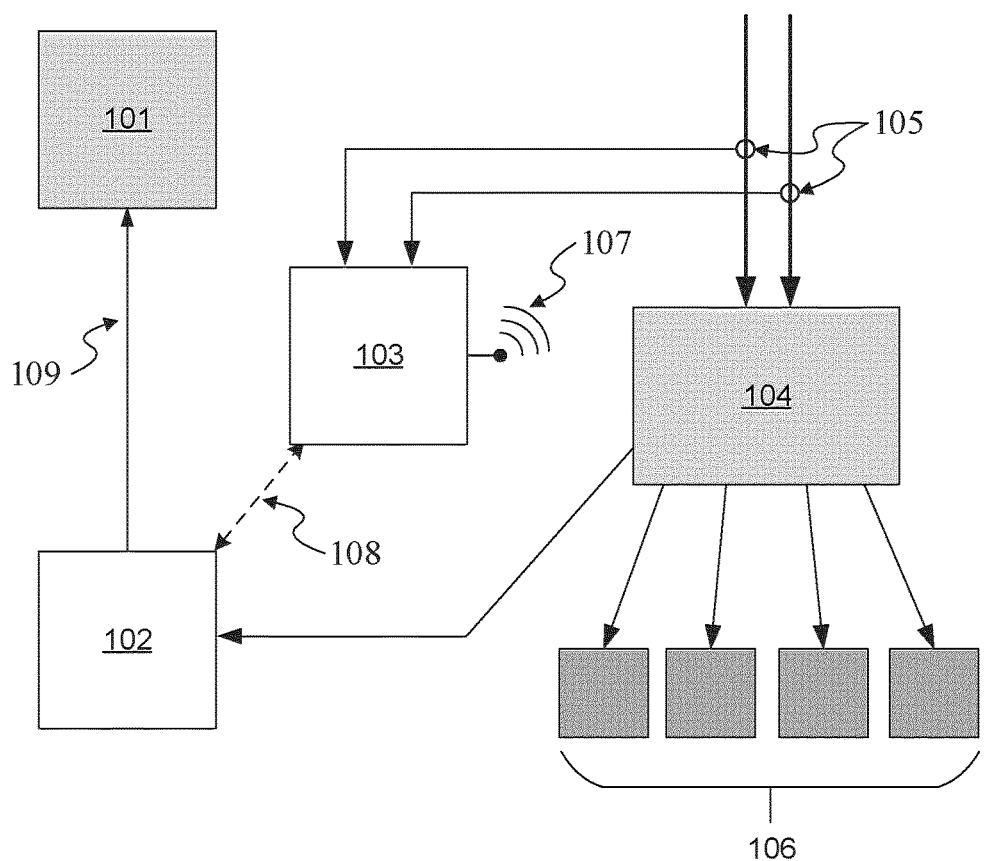
FIG. 1 illustrates a system for monitoring and controlling the electrical power supply to a device, according to an embodiment of the present disclosure.

Referring to the embodiment of FIG. 1, the electrical power or current supplied to an electrical device or devices 101 is being controlled. This computational controller 103 monitors the total electrical current load of the electrical service 105. The total electrical current load powers a combination of controlled devices 101 and other electrical devices or electrical systems 106 not being controlled. Any of the controlled devices 101 or the non-controlled electrical devices 106 may be oscillating electric loads that may turn on and off at different times, independent of each other. The controller 103 is a computational or computing device including communication equipment which is programed to use an algorithm to decide if it can operate an electrical device or devices 101 of various types based on what the total loading of the rest of the electrical system is at any given time, so as to keep the total electrical current load within the design limitations of the electric supply 105. The electric supply 105 is provided to the network from an external source and includes a maximum current capacity, such as 100 A or 200 A for a residential property, or higher amount for industrial applications. The electrical supply 105 with current sensing devices, such as current transformers (CTs), is coupled to a main electrical load center or distribution box 104 as is commonly found in the art. The CTs or other sensing equipment may also be installed in the service connection part of the electrical panel 104 to form a more compact installation. The electrical distribution box 104 distributes electrical power directly to any other electric devices 106 not controlled by the system. The electrical distribution box 104 is also connected through the electric network to switching box 102 which provides electrical power 109 to controlled device 101. Switching box 102 includes a system for switching controlled device 101 on or off, provide multistep switching of the controlled device 101, provide a PWM power supply, or high-resolution proportion load grading of controlled device 101. Switching box 102 is also connected to the controller 103 through a wired or wireless connection 108. Controller 103 monitors the current load of the electrical service 105 which may be done by sensing the total current load through the use of CTs or other means known in the art. Controller 103 may also monitor the current, power, voltage or other electrical properties being used by controlled device 101. Controller 103 may further include a wired or wireless network interface 107 to communicate with external devices to receive programming or configuration information or to provide reporting to external parties. Network interface 107 may allow for monitoring and control of the algorithm of controller 103, the electric supply, and load times. Network interface 107 may provide analytical feedback to a utility or customer for programming the most cost-effective time to use electricity at times where the electrical network or grid has excess capacity, inexpensive rates, or other incentives for use.

The various elements of FIG. 1 may be physically separate units or may be combined. For example, the functionality of switching box 102 or controller 103 may be built into the controlled device 101 or the distribution box 104. In embodiments, a wider application of the system described herein may be built into a central electrical supply or electrical distribution box 104 and control multiple loads based on monitoring the main supply to the system or electrical network with the use of an algorithm and scheduling as described herein.

Figure 2:
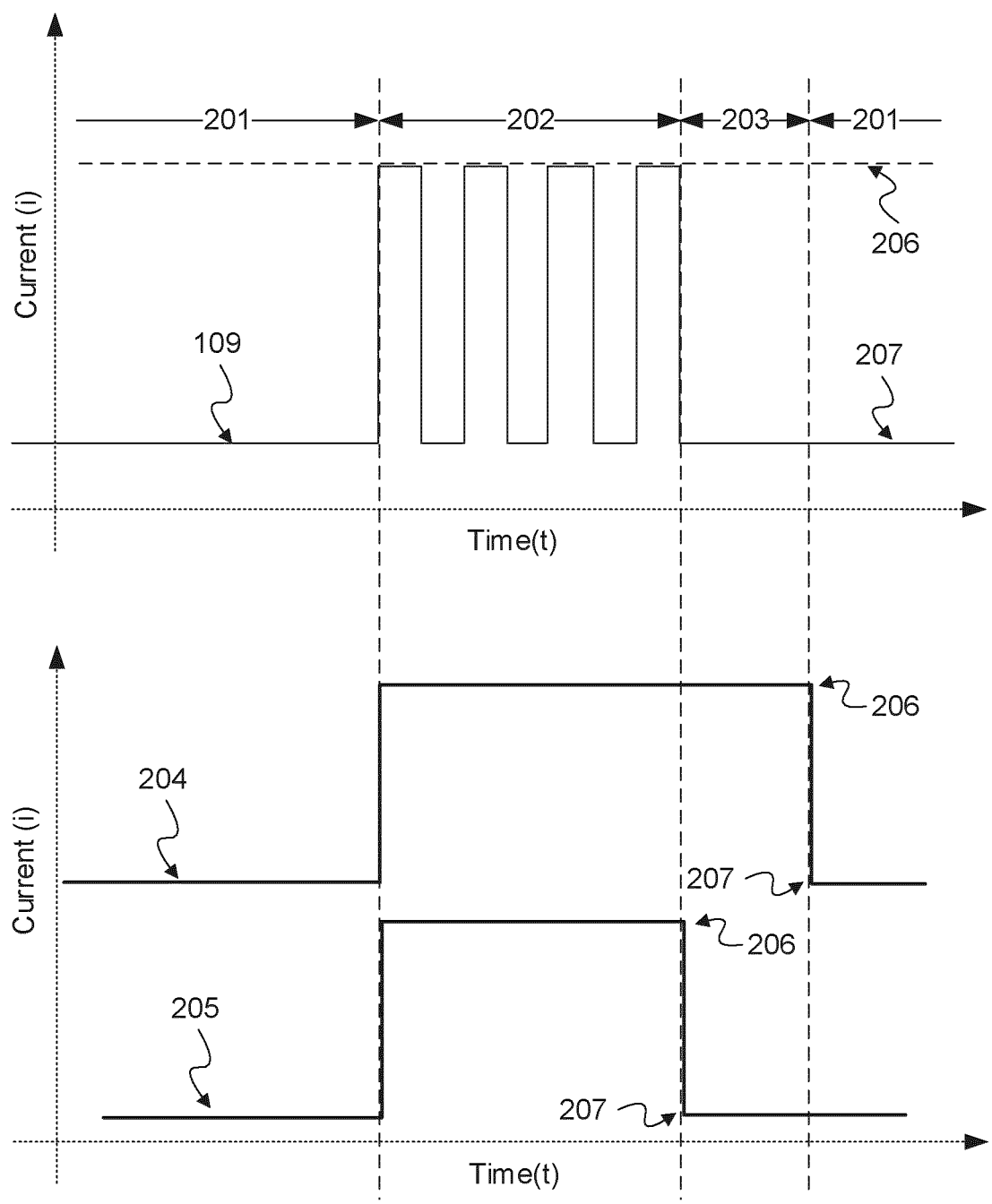
FIG. 2 illustrates an exemplary current profile of a device that is an oscillating load, according to an embodiment of the present disclosure.

FIG. 2 illustrates the electrical current requirements of an oscillating electric load that may be a controlled device 101 or an uncontrolled device 106, according to an embodiment of the present invention. Oscillations as used herein can include periodic, intermittent, or otherwise time-varying changes to the amount of power being drawn from the electric supply by electric devices. An oscillating electric load may be in a number of states including standby 201 and operating 202. There is a further state 203 where the device 102 is no longer operating but may possibly reenter the operating state 202. When in the standby state 201, the oscillating load may draw no power or only a small amount to be maintained in a low power mode, with reduced current or voltage 207. When the oscillating load is in operating state 202 it may cycle on and off between low current level 207 and high current level 206, with the period, duration, current, duty cycle, and voltage being determined by the requirements of the oscillating load. The oscillation period may be constant or variable. With some oscillating loads, the current 109 may cycle on and off every 30 seconds or less while in other cases it may be several minutes or more. Other oscillating loads may have a shorter of longer oscillation period. Switching box 102 will be able to supply electric power to an oscillating load, controlled device 101 within specification of the controlled device 101 to enable efficient operation and to avoid damage to controlled device 101.

The length of state 203 may be pre-determined or determined dynamically. The length of state 203 should be long enough to avoid cases where the oscillating load turns off and then turns on after a short period of time. In embodiments, this may be determined by a characteristic of the oscillating load. For example, an oscillating load may have a heating up or cooling down period in order to operate efficiently and the length of state 203 may be selected to exceed or not exceed this period. Based on past monitoring, schedules, or on configuration information, it may be assumed that an oscillating load is used on and off during a particular time of day or day of the week as well. This historical information may be used to determine and adjust the delay state 203. An example is an induction range that is known to be used daily during the late afternoon or early evenings.

In embodiments, when an oscillating load is operating, the total current load of the electrical service 105 will vary between low level 207 and high level 206 in response to the current drawn 109 by the oscillating load. When not drawing current or drawing current at low level 207, there may be sufficient current capacity in the electric network to operate a controlled device 101. However, when the oscillating load draws current at high level 206, the addition of the current required by the controlled device 101 may exceed the total capacity of the electric network and have to be shut down by controller 103 and switching box 102 to prevent an overload state. This would lead to the controlled device 101 being enabled and disabled at the same frequency as the operating state 202 of the oscillating load, which may damage or reduce the life span of the controlled device 101. For example, if the controlled device 101 is an EV charger, designed to be turned on for several hours, run at a steady state to charge an EV, then be turned off, turning the EV charger on and off rapidly would be outside the design and operational parameters of the EV charger and damage the EV charger.

In embodiments, the sensed oscillations of the power consumption of an oscillating load while in the operating state 202 may be filtered out or ignored when determining if the oscillating load is in operating state 202. Filtering oscillations may be done by taking on/off or step changes in the supply or demand that occur above a given frequency ignoring when the supply is off, or at a low level 207, and assuming the current draw is at the high level 206. When determining if there is excess electric capacity sufficient to enable a controlled device 101, the operating state 202 oscillations will be ignored to prevent enabling and disabling a controlled device 101 at high speed. After filtering oscillations, the algorithm of controller 103 will look at the electrical network current draw 105 or the controlled device current draw 109 as shown by current 204 when delay state 203 is used, and by current 205 when delay state 203 is not used.

The controller 103 may sense the electrical power or current 109 used by the controlled device in a number of ways. This may include the controller 103 tracking how it instructs the switching box 102 to control the current supplied to controlled device 101 with no feedback. Alternatively, switching box 102 may sense the current drawn by controlled device 101 and report this information over link 108 to the controller 103. Alternatively, controller 103 may directly sense or receive the electrical power use from controlled device 101.

The controller 103 will enable the controlled device 101 in a number of ways while maintaining compatibility with the requirements of the controlled device 101. In embodiments, electrical power may be enabled for the controlled device 101 during high current level 206 of current 204 where the enable signal is present during the operating state 202 and state 203. In other embodiments, state 203 may not be used or may not be required and enable signal may be used during the high current level 206 of current 205.

Figure 3:
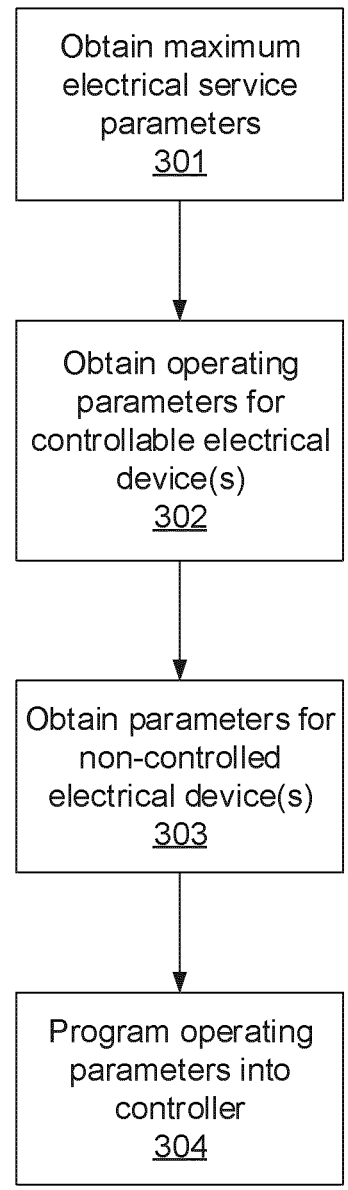
FIG. 3 illustrates a method for configuring a system for monitoring and controlling the electrical power supply to a device, according to an embodiment of the present disclosure.

FIG. 3 illustrates a method for configuring or programming the controller 103. Configuration of the components of the system, such as controller 103 or switching box 102, may include setting switches or adjusting potentiometers to control current levels or other limits of electrical parameters. Other potentiometers may be used to set timing parameters such as a minimum or maximum time of a power oscillation of an oscillating load to ignore, a value of delay state 203, or other time parameter. Configuration may also be done by programming or setting values in the memory of a microcontroller or through use of a ROM. Configuration or programming may be done through a user interface on the controller 103 or through a network graphical user interface (GUI). In step 301 electrical service parameters are obtained. This may include maximum current, voltage parameters, time-of-day pricing or restrictions, power factor, etc. In step 302 operating parameters for controllable electric device 101 are obtained. These parameters form a usage profile of the controllable device 101. If controllable device 101 is not an oscillating load, parameters may include a DC operating requirement or parameters related to minimum or maximum values of power oscillations that may be safely experienced by the controllable device 101. If the controllable device 101 is an oscillating load, parameters may be related to the states 201, 202, and 203 illustrated in FIG. 2 and may include desired settings, maximum settings, minimum settings, etc. They may also include use history of oscillating loads, controlled devices 101 or non-controlled devices 106, in the system, such as a time of day or day of week that the oscillating loads are used and for how long. For example, a kitchen range, that is an oscillating load, may be predominantly used in the late afternoon or early evening, but not on the weekend. Controlled device parameters may also be used to calculate the length of state 203 based on actual use, desired use, as well as technical limitations of the controlled device 101. In step 303 operating parameters for non-controllable electric loads 106 may be obtained. These parameters may be a maximum current draw but may also include additional parameters such as a time when the non-controllable loads 106 are used and parameters relevant when the non-controllable device 106 is an oscillating load. In embodiments, step 303 may be optional. In step 304, the parameters obtained in steps 301, 302, and 303 are configured or programmed into the controller 103. In embodiments, some parameters may also be programmed into switching box 102. Programming operating parameters on the controller 103 or switching box 102 may be done using a variety of means. This includes setting DIP switches or toggle switches, programming through a user interface such as a touch screen or keypad, through the network interface 107, through a mobile device app, or other means.

Figure 4:
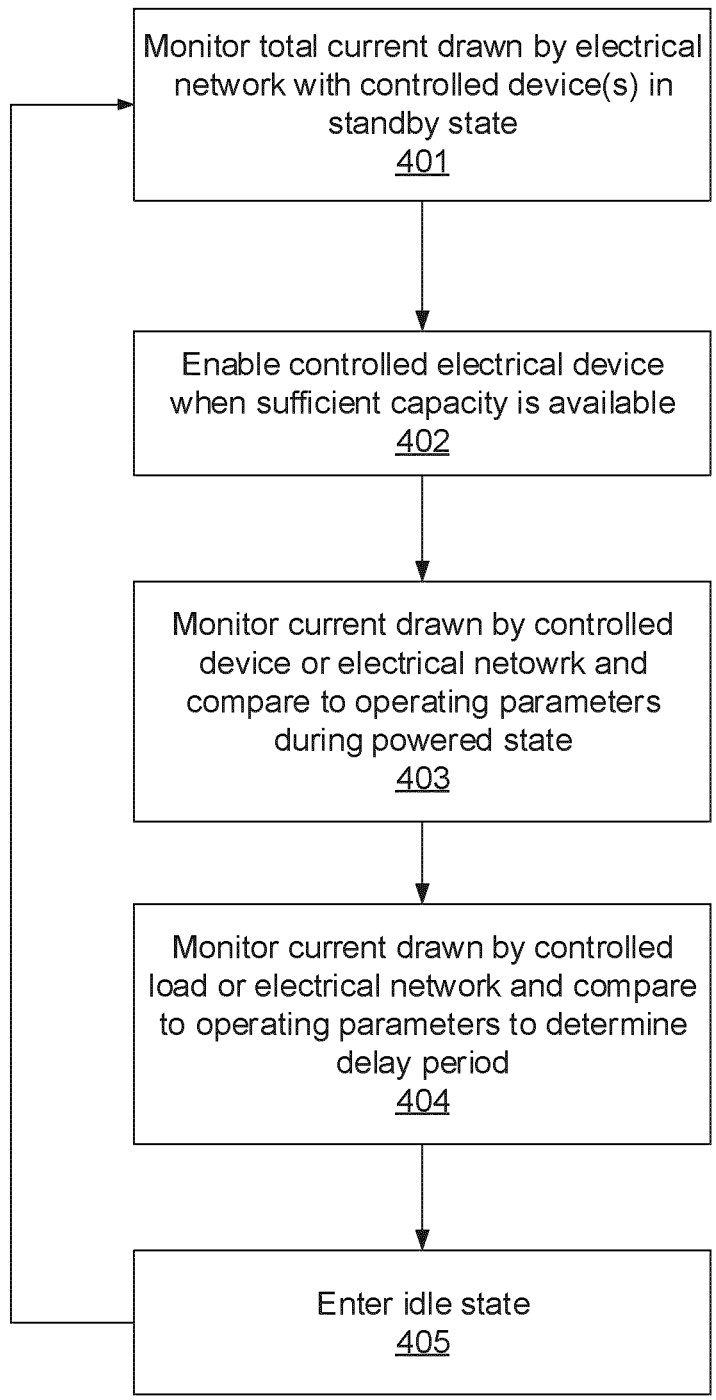
FIG. 4 illustrates a method for operating a system for monitoring and controlling the electrical power supply to a device, according to an embodiment of the present disclosure.

FIG. 4 illustrates a method to be performed by the controller 103 to control switching box 102 and controlled device(s) 101. The method includes an algorithm to be executed by a microcontroller or microprocessor in controller 103. A number of different algorithms may be used depending on the particulars of the devices in the electrical network. A single controller 103 may be programed with multiple algorithms that are selected through configuration or at runtime. A controller 103 may also have its algorithm programed into it when powered on or over the network as required. The algorithm causes electrical power or current to be supplied to the controlled device 101 in a way to prevent problematic oscillation of the power supplied to controlled device 101 from switching box 102. An objective of the algorithm is to allow a high current controlled device 101 to operate as often and at as high an electrical draw as possible without allowing the whole system to go into an overload state. This may be done by shutting off or reducing the device's 101 electrical consumption 109 by turning the device 101 completely off and on when needed, multistep loading of the device, or high-resolution proportional loading of the electrical device 101 when the rest of the system will require it based on the algorithm monitoring of the main electrical supply.

When scheduling the use of a controlled device, the algorithm may consider whether to allow for more efficiency by operating at a low electrical cost time of use, more efficient use of the electrical grid infrastructure by multiple end users, or providing the longest electrical availability to the device being controlled, and avoiding any need to upgrade the electrical service supply capacity. An example would be to schedule the use of an EV charger until after 10 pm in order to take advantage of lower cost electricity and that historical usage patterns of the electric network show that there is excess capacity in the electric network after 10 pm.

In step 401, the controller 103 monitors the total power or current drawn by the electrical network 105. This may be done with the network in a known state such as when any other controlled devices are in standby state 201, in order to determine the available electrical capacity at that time. Schedules, parameters gathered in step 303, and other means may also be used to estimate present or future capacity. The controller may monitor and track common cycles of usage and usage patterns to produce and update a predictive schedule for each controlled device 101. The controller 103 determines if there is sufficient unused electrical capacity to enable the controlled device 103.

When monitoring the total power and available power of the electrical network 105, there may be one or more uncontrolled devices 105 that are oscillating nodes and draw current as illustrated in FIG. 2. The algorithm of the controller 103 may be configured to ignore the higher frequency oscillations of operating stage 202 and model the current drawn as shown by 204 and 205. This model may be extended to include the delay 203 as well. The algorithm will treat the current due to oscillating loads as DC loads when determining available electrical capacity of the use of controlled device 101.

The controller 103 will continue to monitor the total power or current drawn by the electrical network 105 throughout the operation of the system. While controlled device 101 is operating, the current drawn by controlled device 101 will add to the total current 105. Controller 103 may be configured to detect overload conditions and reduce, limit, or stop operation of the controlled device 101 exceeds expected operating limits. Controller 103 may also reduce, limit, or stop operation of the controlled device 101 if the current draw due to uncontrolled devices 105 or other controlled devices exceeds the maximum capacity of the electrical network at 105. If the controller 103 is controlling multiple controlled devices 101, it may reduce, limit, or stop operation of one controlled device in order to allow the other controlled device to operate.

In step 402, the controller 103 determines when to enable the controlled device 101 and the parameters that apply to the electric power consumption of the controlled device 101 and then enable power to the controlled device 101. Controller 103 will ensure that there is sufficient excess power or current capacity in the electric network to safely enable controlled device 101. If the algorithm determines that the sufficient power for the controlled device 103 may only be available for a short period of time, the algorithm may delay enabling the controlled device 101 until the algorithm determines that it may enable the controlled device 103 for at least a minimum time period. In embodiments, there may also be a separate enable or on/off signal sent to the controlled device 101.

In step 403, the control algorithm executed by controller 103 may monitor the current drawn 109 by any controlled devices 101, by the current drawn by the electric network 105, or both. Monitoring current draw 109 may be done by the controller 103 monitoring fluctuations in supply 105, by controller 103 receiving current drawn 109 by controlled device 101 from switching box 102, by controller 103 receiving current drawn 109 by controlled device 101 directly, or by a combination of methods. Current drawn by uncontrolled devices 105 may be determined by monitoring the total current of the electric network 105 and by subtracting the effects of controlled device(s) 101. If there are any oscillating loads operating in the electric network 105, current draw 109 may switch between a high and low level as illustrated during operating state 202 of FIG. 2. Controller 103 may utilize the usage profile of configuration information for controlled device 101 to determine that the switching is part of the expected operation of a controlled device 101 and thereby know that controlled device 101 is operating as expected. The control algorithm may apply a filter to current drawn 109 measurements to ignore short term switching. The control algorithm may also compare operating current draw 109 to expected values and report expected or incorrect operation through indicators, such as LEDs, on a display, or to a control system over network 107.

In step 404, the control algorithm continues to monitor the current drawn and based on the controlled device usage profile, and the absence of current oscillations, determine that the any oscillating loads may have finished or suspended operation. If the controlled device is an oscillating load, this may be determined by detecting that the current drawn 109 by the controlled device 101 has returned to an amount expected when the controlled device 101 is in the idle state 201. Current drawn by the controlled device 101 may also be determined by detecting that the total current drawn 105 based on the monitored current draw in step 401 and the known or expected operating parameters of the controlled device 101. The controller 103 may attempt to provide a maximum amount of current 109 to the controlled device 101 within operating limits of the controlled device 101 and the maximum allowable current capacity of the electric network. If thresholds corresponding to maximum current amounts are exceeded, the controller 103 may reduce, limit, or remove power to the controller device 101. If there are uncontrolled devices that are oscillating loads, the absence of current oscillations are detected and the algorithm may assume that the uncontrolled device has finished or suspended operation. The algorithm then waits an amount of time 203 after which it assumes that the oscillating load is in the idle state 201. The delay 203 may be used for cases where the oscillating load may finish operating but start to operate again after a short period of time. This could be the case where a range is being used to heat a first pot, then a second pot shortly afterwards. It could also be the case where a first EV is charged, then a second EV is plugged in shortly after charging of the first EV is completed. Once delay period 404 is complete the controller 103 may allocate the available electrical supply 105 to other controlled devices. In embodiments delay 203 may be omitted or be zero (0).

In step 405 the algorithm enters an idle state until a controlled device has to be enabled. The algorithm may control a single controlled device 101 or several controlled devices. Different instances of the algorithm may be activated for each of several controlled devices with the controller 103 only entering step 405 when all controlled devices are in standby state 201.

Throughout the steps of FIG. 4, the algorithm monitors and tracks the available electrical power and current of the electric network.

In an embodiment, the controlled device 101 may be a non-oscillating load that is averse to having its current 109 cycled on and off frequently. Non-controlled devices 106 include at least one oscillating load. There is only sufficient capacity in the electrical network to operate the controlled device 101 when the non-controlled, oscillating device 106 is in the off or idle state 201. Controller 103 monitors the total current 105 of the electric network and observes the oscillations in the current drawn by the non-controlled, oscillating device 106 when it is in the operating state 202. At this time, there is insufficient capacity in the system to enable controlled device 101. When the current drawn by the non-controlled load 106 is at low level 107, there is sufficient capacity to enable the controlled device 101 but to enable the controlled device 101 each period of the oscillations would exceed the design and operating parameters of the controlled device 101 and could lead to damage. Therefore, the controller 103 filters out the oscillations in current 105 and models the current as shown by line 204 or 205. When the non-controlled, oscillating device 106 exits operating state 202, controller 103 detects this in current 105 of the electrical network. Based in configuration, schedules, or historical data, the controller 103 may wait a further delay period 203 (as shown in line 204) before determining that there is sufficient capacity in the electrical network to enable controlled device 101. To enable controlled device 101, controller 103 signals to switching box 102 to enable the power to controlled device 101. Controller 103 may also report the status of controlled device 101 externally over network 107.

Figure 5:
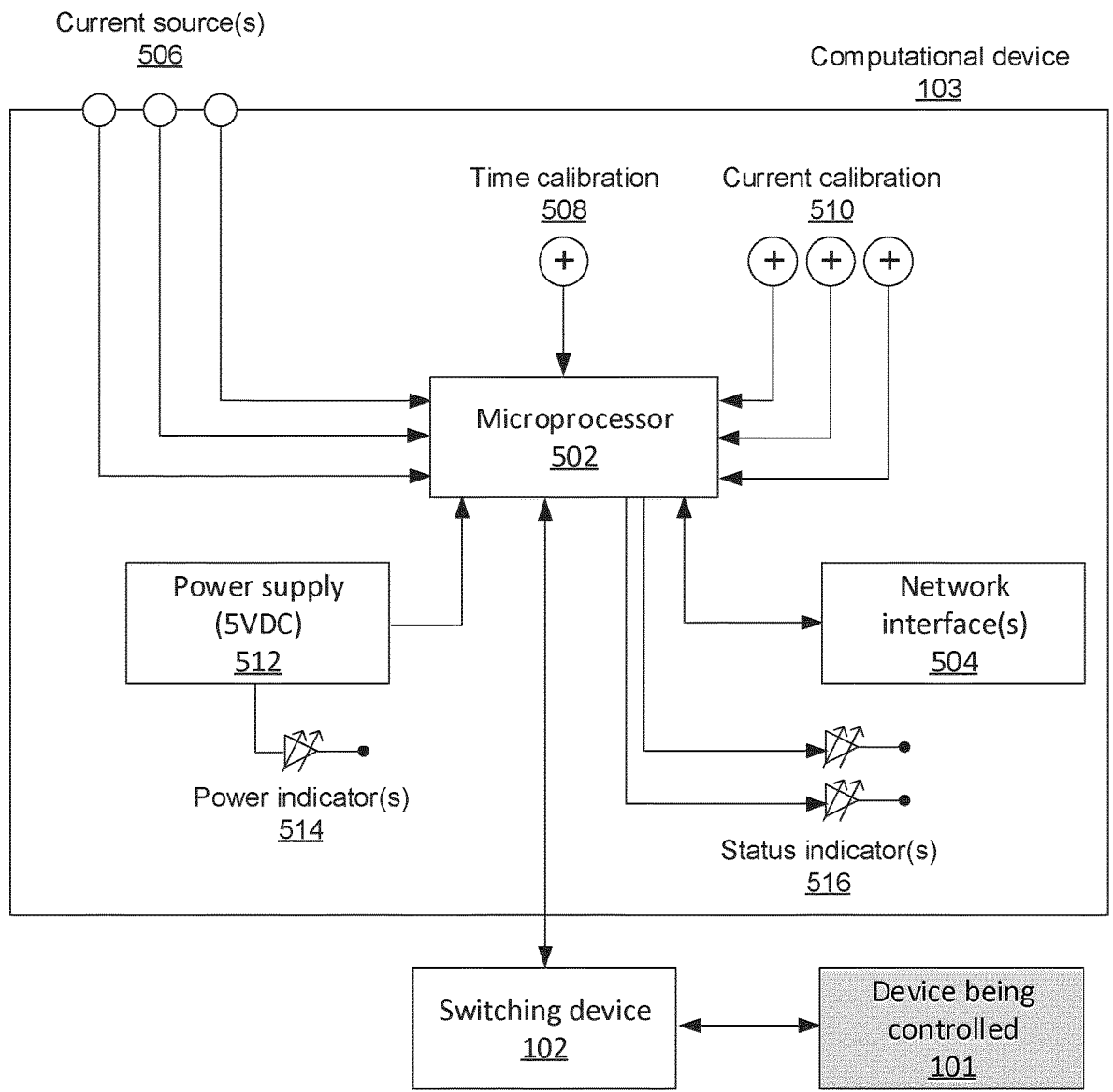
FIG. 5 illustrates a block diagram of a system for monitoring and controlling the electrical power supply to a device showing implementation details, according to an embodiment of the present disclosure.

FIG. 5 includes a block diagram of controller 103 according to an embodiment. Controller 103 includes a processor, such as microprocessor 502, a power supply 512, a network interface 504, and calibration controls; time calibration 508, and current calibration 510. Controller 103 may also include power indicators 514 and status indicators 516. Microprocessor 502 includes a processor core, non-volatile memory for program and parameter storage, and memory used during execution of computer code such as the algorithm described herein. Microprocessor 502 is coupled to network interface 504 through a parallel or serial bus to send and receive messages over the wired or wireless network. Controller 103 may use the network interface to communicate and coordinate with controllers of other systems to obtain data to adjust on/off times and schedules. A secondary function of the network interface is monitoring and updating the programming of the microprocessor 502. Microprocessor 502 also includes sufficient input/output pins to communicate with current sources 506, indicators, and calibration input. Microprocessor 502 continuously monitors currents sources 506, calibration potentiometers 510 as well as time adjustment potentiometers 510 and feed this data into algorithm Power supply 512 converts an external AC voltage and converts it from a variety of AC voltages and frequencies to 5 VDC the appropriate voltage to power the microprocessor 502 and other components, typically 3.3 VDC or 5 VDC. Power indicator 514 may be an LED used to indicate when the appropriate voltage is present. Status indicator(s) 516 may be LED(s) or a display panel and may indicate the state of outputs and switches are in as well as possible error codes. Time calibration 508 may be a potentiometer to set the length of delay 203. Current calibration 510 may also include potentiometers to set current limits for the controlled device 101. DIP switches may also be included to set modes of the microprocessor 502 or controller 103. DIP switches may also be used to configure if time delay 203 will be used. External current may be sensed and monitored through current source(s) 506 with protection and limiting circuitry between the current source(s) 506 and microprocessor 502 as is known in the art. The number of current sources 506, outputs, status LEDs and potentiometers may vary to fit the environment and electrical structure it will be monitoring. Though this description describes components such as potentiometers, DIP switches, and LEDs, alternative components may be used. Computer or network interfaces, APIs, mobile device apps, etc. may also be used to configure, monitor, or otherwise interact with controller 103 and other portions of the system.

Figure 6:
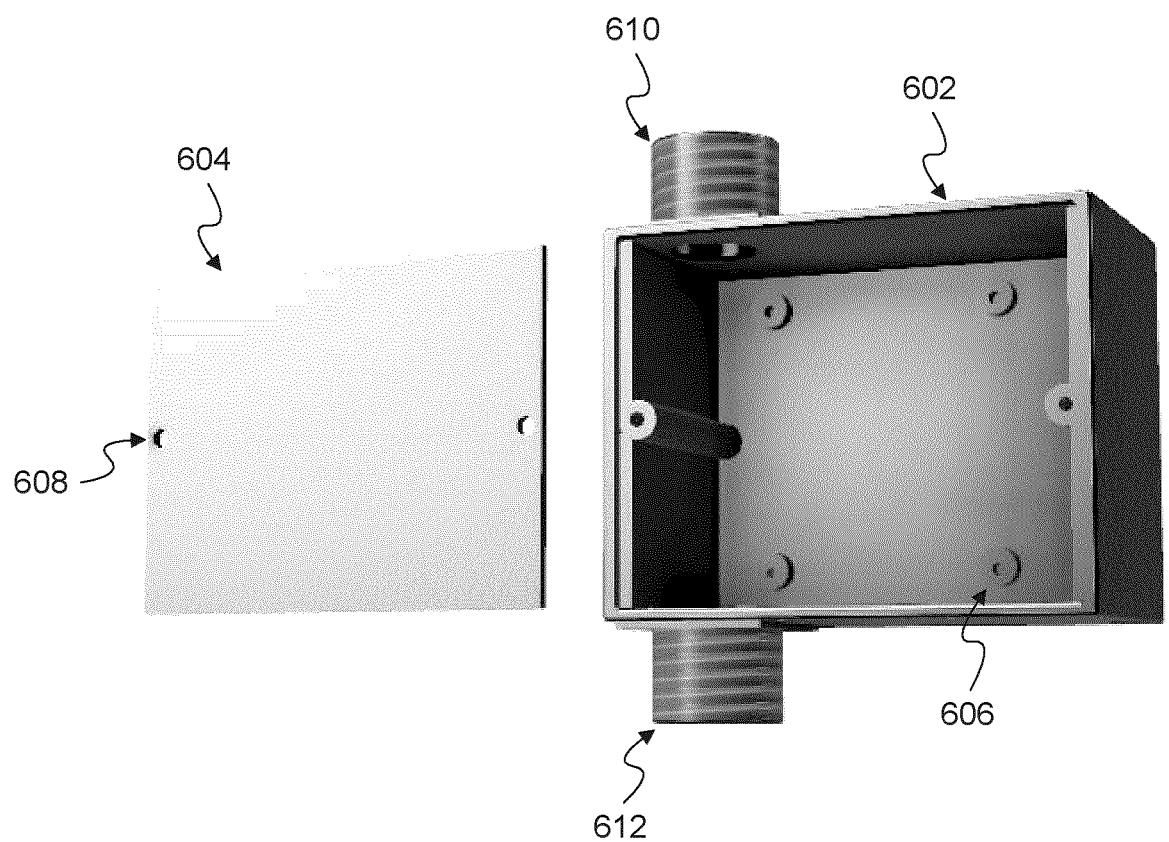
FIG. 6 illustrates an enclosure that may be used to mount and install the system, according to an embodiment of the present disclosure.

FIG. 6 illustrates an enclosure 600 that may be used to mount and install the system, according to an embodiment. Enclosure 600 includes a housing 602 in the shape of a box in which the electronic portion of controller 103 is mounted. A cover 604 is used to close the housing 602 and may be fixed in place through holes 608 which may accept screws or fasteners. Holes 608 may also accept screws sufficiently long to extend through the housing 602 and into a structure to which the enclosure 600 is to be mounted. Housing 602 may also be securely mounted in place through holes 606. Holes 606 may also be standoff mounts for the controller 103 PCB. Power may enter and exit housing 602 through openings 610 and 612 which may be placed on opposite sides of housing 602. Openings 610 and 612 may be implemented as threaded nipples that also allow locknuts to be fixed to maintain entering and exiting wiring to be held firmly in place. In embodiments, enclosure 600 is has dimensions and is formed of materials that allow it to be mounted with other parts of the electrical network such as electrical distribution box 104.

In embodiments additional capabilities may be directly wired or connected wirelessly. This includes communication between the controller 103 and switching box 102 over link 108. There may also be wired or wireless communication through network interface 107 that will allow local or remote control and monitoring of the control system.

In embodiments where multiple electric networks are used or multiple controllers 103 are used in a single network, communication over network interface 107 may be used to send and receive electrical usage information between controllers in order to ensure efficient control of controlled devices 101. In this case, there may be two of more controllers, two or more electric networks, etc.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for controlling an electric device, the method comprising:
   monitoring, by a controller, a current usage of an electric supply of an electric network;
   determining, by the controller, that an excess current capacity of the electric supply is less than a required current of the electric device;
   monitoring, by the controller, the use of the electric supply, the monitoring of the use of the electric supply including filtering current oscillations in the use of the electric supply, the current oscillations comprising switchings between at least a high current level and a low current level which occur at or above a predetermined switching frequency, the current oscillations being due to correspondingly switching current draws by one or more loads when operating, the current oscillations being in addition to a generally sinusoidal characteristic of alternating current in the electric network, the filtering comprising filtering out said switchings occurring at or above the predetermined switching frequency;
   determining, by the controller and based on said monitoring including filtering, that the excess current capacity has become greater than the required current; and
   waiting, by the controller, in response to determining that the excess current capacity has become greater than the required current, a delay time after said determining, the delay time based on a usage profile of the electric supply, the excess current capacity being greater than the required current for the delay time indicating that the excess current capacity is expected to remain greater than the required current for at least a minimum time period appropriate for operation of the electric device, and enabling the current to the electric device conditional upon the excess current capacity being greater than the required current for the delay time.

2. The method of claim 1 where the usage profile includes values defining parameters of the current oscillations, and the delay time when the one or more loads are no longer operating but may begin operating again prior to expiry of the minimum time period.

3. The method of claim 1 further comprising receiving over a network interface, configuration information of the usage profile.

4. The method of claim 3 wherein the usage profile includes electrical cost time of use information.

5. The method of claim 1 wherein the monitoring of the current of the electric network is performed continuously.

6. The method of claim 1 wherein the delay time is based on a schedule of the electric supply.

7. The method of claim 1 wherein the controller is in communication with a second controller of a second electric device using a second electric supply, and the determining that there is an excess current capacity includes receiving current usage information of the second electric device from the second controller.

8. The method of claim 1 further comprising sending, by the controller, a status of the electric device to a controller of the electric network.

9. The method of claim 1 wherein the delay time is based on a schedule of past current usage of the electric device.

10. The method of claim 1 further comprising monitoring, by the controller, the current usage of the electric supply, detecting an increase in the current usage of the electric supply that would exceed the current capacity of the electric supply, and reducing the current to the electric device.

11. The method of claim 1, wherein the filtering comprises ignoring all instances of the low current level in the current oscillations.

12. The method of claim 1, wherein the minimum time period is set based on the electric device to avoid damage thereto or to avoid reduced life span thereof.

13. An apparatus for controlling an electric device, the apparatus comprising:
    a microprocessor; and
    a computer readable, non-transitory memory storing instruction that when executed by the microprocessor cause the apparatus to:
    monitor a current usage of an electric supply of an electric network;
    determine that an excess current capacity of the electric supply is less than a required current of the electric device;
    monitor the use of the electric supply, the monitoring of the use of the electric supply including filtering current oscillations in the use of the electric supply, the current oscillations comprising switchings between at least a high current level and a low current level which occur at or above a predetermined switching frequency, the current oscillations being due to correspondingly switching current draws by one or more loads when operating, the current oscillations being in addition to a generally sinusoidal characteristic of alternating current in the electric network, the filtering comprising filtering out said switchings occurring at or above the predetermined switching frequency;
    determine, based on said monitoring including filtering, that the excess current capacity has become greater than the required current; and
    wait, in response to determining that the excess current capacity has become greater than the required current, a delay time after said determining, the delay time based on a usage profile of the electric supply and enabling the current to the electric device, the excess current capacity being greater than the required current for the delay time indicating that the excess current capacity is expected to remain greater than the required current for at least a minimum time period appropriate for operation of the electric device, and enabling the current to the electric device conditional upon the excess current capacity being greater than the required current for the delay time.

14. The apparatus of claim 13 where the usage profile includes values defining parameters of the current oscillations, and the delay time when the one or more loads are no longer operating but may begin operating again prior to expiry of the minimum time period.

15. The apparatus of claim 13 wherein the stored instructions when executed by the microprocessor cause the apparatus to receive over a network interface, configuration information of the usage profile.

16. The apparatus of claim 15 wherein the usage profile includes electrical cost time of use information.

17. The apparatus of claim 13 wherein the monitoring of the current of the electric network is performed continuously.

18. The apparatus of claim 13 wherein the delay time is based on a schedule of the electric supply.

19. The apparatus of claim 13 wherein the stored instructions when executed by the microprocessor cause the apparatus to further communicate with a second controller of a second electric device using a second electric supply, wherein the determining that there is an excess current capacity includes receiving current usage information of the second electric device from the second controller.

20. The apparatus of claim 13 wherein the stored instructions when executed by the microprocessor cause the apparatus to send a status of the electric device to a controller of the electric network.

21. The apparatus of claim 13 wherein the delay time is based on a schedule of past current usage of the electric device.

22. The apparatus of claim 13 wherein the stored instructions when executed by the microprocessor cause the apparatus to further monitor the usage of the electric supply, detect an increase in the usage of the electric supply that would exceed the capacity of the electric supply, and reducing the power of the electric device.

23. The apparatus of claim 13, wherein the filtering comprises ignoring all instances of the low current level in the current oscillations.

24. The apparatus of claim 13, wherein the minimum time period is set based on the electric device to avoid damage thereto or to avoid reduced life span thereof.

* * * * *